(12) United States Patent
Kopplow et al.

(10) Patent No.: US 9,186,947 B2
(45) Date of Patent: Nov. 17, 2015

(54) AXLE FIXATION FOR A SPRUNG VEHICLE AXLE

(71) Applicant: BPW Bergische Achsen KG, Wiehl (DE)

(72) Inventors: Hans-Werner Kopplow, Nümbrecht (DE); Thomas Kriegeskotte, Reichshof (DE); Manfred Michels, Köln (DE)

(73) Assignee: BPW Bergische Achsen KG, Wiehl (DE)

( * ) Notice: Subject to any disclaimer, the term of this patent is extended or adjusted under 35 U.S.C. 154(b) by 0 days.

(21) Appl. No.: 14/399,531

(22) PCT Filed: May 2, 2013

(86) PCT No.: PCT/DE2013/100161
§ 371 (c)(1),
(2) Date: Nov. 7, 2014

(87) PCT Pub. No.: WO2013/167118
PCT Pub. Date: Nov. 14, 2013

(65) Prior Publication Data
US 2015/0115565 A1  Apr. 30, 2015

(30) Foreign Application Priority Data
May 7, 2012 (DE) .................... 10 2012 103 961

(51) Int. Cl.
*B60G 11/00* (2006.01)
*B60G 11/113* (2006.01)
*B60G 9/02* (2006.01)
*B60G 9/00* (2006.01)
*B60G 11/46* (2006.01)
*F16F 1/368* (2006.01)

(52) U.S. Cl.
CPC ............... *B60G 11/113* (2013.01); *B60G 9/00* (2013.01); *B60G 9/003* (2013.01); *B60G 9/02* (2013.01);
(Continued)

(58) Field of Classification Search
CPC ............ B60G 9/00; B60G 9/02; B60G 9/003; B60G 11/113; B60G 2200/31

USPC .................... 280/124.175, 124.128, 124.116
See application file for complete search history.

(56) References Cited

U.S. PATENT DOCUMENTS

| 3,734,482 A | 5/1973 | Duchemin |
| 6,406,044 B1 * | 6/2002 | Wisotzky .................... 280/124.1 |
| 8,226,099 B2 * | 7/2012 | Koschinat .............. 280/124.116 |

(Continued)

FOREIGN PATENT DOCUMENTS

| DE | 93 05 039 U1 | 8/1994 |
| DE | 297 13 996 U1 | 12/1998 |

(Continued)

*Primary Examiner* — Faye M Fleming
(74) *Attorney, Agent, or Firm* — Gudrun E. Huckett

(57) ABSTRACT

The invention relates to an axle fixation, an axle plate (5), and an axle link (2) for a sprung vehicle axle. The components of the axle fixation are a preferably tubular axle body (1), an axle link (2) which crosses the upper face and lower face of the axle body, the axle plate (5) which is arranged in the crossing region between the axle body (1) and the axle link (2), and traction elements for pulling the axle body (1) and the axle link (2) against each other, thereby deforming the axle plate (5). The axle plate (5)—is provided with two contact points (A, B) on the first side of the axle plate for supporting against the axle link (2), said contact points being mutually spaced in the longitudinal direction of the axle link (2), —has at least one deformation region (10) between the two contact points (A, B), and—is provided with a jaw (14) on the second side of the axle plate, said jaw comprising a jaw base (15) and two jaw units (11, 12) with inner surfaces (11A, 12A) which face each other and which are oriented towards the front and back face of the axle body (1), respectively. The aim of the invention is to obtain an axle fixation or an axle plate (5) with few degrees of freedom in the composite system consisting of the axle body, the axle link, and the axle plate arranged therebetween. This is achieved in that the contact points (A, B) of the axle plate (5) are designed as support regions (21, 22) which form a flat "V", preferably forming an angle from 170° to 177.5°.

17 Claims, 2 Drawing Sheets

(52) U.S. Cl.
CPC ............ *B60G 11/46* (2013.01); *B60G 2200/31* (2013.01); *B60G 2202/112* (2013.01); *B60G 2204/148* (2013.01); *B60G 2204/4306* (2013.01); *B60G 2204/44* (2013.01); *B60G 2206/428* (2013.01); *F16F 1/3683* (2013.01)

(56) References Cited

U.S. PATENT DOCUMENTS

| | | | |
|---|---|---|---|
| 2005/0253351 A1* | 11/2005 | Pan et al. | 280/124.116 |
| 2014/0197613 A1* | 7/2014 | Aalderink | 280/124.116 |

FOREIGN PATENT DOCUMENTS

| | | |
|---|---|---|
| DE | 199 46 802 A1 | 4/2001 |
| DE | 101 10 495 A1 | 9/2002 |
| DE | 10 2009 030 633 A1 | 12/2010 |
| EP | 0 810 109 A1 | 12/1997 |
| EP | 1 249 356 A1 | 10/2002 |
| EP | 1 273 464 A1 | 1/2003 |
| EP | 1 958 801 A2 | 8/2008 |
| FR | 2 088 906 | 1/1972 |

* cited by examiner

AXLE FIXATION FOR A SPRUNG VEHICLE AXLE

BACKGROUND OF THE INVENTION

The invention relates to an axle connection for a sprung vehicle axle having a preferably tubular axle beam, axle guides which cross the axle beam on its upper or underside, an axle plate which is arranged between the axle beam and the respective axle guide, and tension elements for pulling the axle beam and the axle guide against one another with deformation of the axle plate, the axle plate being provided on its first side with two bearing locations which are spaced apart from one another in the longitudinal direction and at which the axle plate is supported against the axle guide, having at least one deformation region between the two bearing locations, and being provided on its second side with a mouth with a mouth base and two jaws with inner faces which face one another, the inner faces being directed against the front and the rear side of the axle beam.

Furthermore, the invention relates to an axle plate which is suitable for an axle connection of this type, for arranging in the crossing region between an axle beam and an axle guide of a vehicle, which axle guide guides said axle beam, which axle plate is provided on its first side with two bearing locations which are spaced apart from one another in the longitudinal direction for support against the axle guide, has at least one deformation region between the two bearing locations, and is provided on its second side with a mouth with a mouth base and two jaws with the inner faces which face one another.

Furthermore, the invention relates to an axle guide which is likewise suitable for an axle connection of this type, having a supporting region for the pivotable support of the axle guide with respect to the vehicle frame, an axle connecting region for connecting the axle guide to the axle beam, and a fastening region for a pneumatic spring, the axle connecting region having two bearing locations which are spaced apart from one another in the longitudinal direction of the axle guide for supporting corresponding bearing locations of an axle plate which is arranged between the axle guide and the axle beam.

An axle connection of this type using an axle plate which is arranged between the axle beam and the axle guide in their crossing region is known from EP 0 810 109 B1. The axle plate is of deformable design in its center and is provided with two strip-shaped pressure faces on its first side which faces the axle guide. Bending of the axle plate in the deformation region and clamping of the axle beam between two jaws on the second side of the axle plate occur as a result of the application of a tensile force by means of tension elements which are designed as U-hoops.

FIG. 1 shows the axle connection according to EP 0 810 109 B1 in the mounted state, that is to say with tightened U-hoops. The axle plate 5 bends in its deformation region 10, as a result of which its two jaws 11, 12 pivot somewhat, and the inner faces 11A, 11B of the jaw clamp against the front and the rear side of the axle beam 1. After the beginning of the deformation, contact exists between the axle plate 5 and the axle guide 2 only on the inner edges (denoted by A and B) of the otherwise strip-shaped pressure faces. The two locations A and B are to this extent linear pivoting bearings during the pivoting of the jaws 11, 12. One disadvantage of this design is that high local surface pressures occur in the contact region between the axle plate and the axle guide despite the actually strip-shaped pressure faces. The retaining forces in the longitudinal direction of the axle beam as a result of friction and therefore non-positive connection are also transmitted only along the contact lines. In addition, a degree of movement freedom perpendicularly with respect to the surface of the axle beam remains in the contact region, with the result that the assembly comprising the axle beam, the axle guide and the axle plate which is arranged in between has more degrees of movement freedom than are desirable for a secure axle connection.

The invention aims for an axle connection for a sprung vehicle axle with fewer degrees of freedom in the assembly comprising the axle beam, the axle guide and the axle plate which is arranged in between.

SUMMARY OF THE INVENTION

An axle connection characterized in that the bearing locations are configured as supporting regions which form a flat "V" in the case of a non-deformed axle plate, preferably with an enclosed angle of from 170° to 177.5°, is proposed to achieve this object.

An assembly system of this type comprising the axle beam, the axle guide and the axle plate which is arranged in between operates with fewer remaining degrees of freedom and more reliable retention of the axle plate on the axle guide. This is achieved by the supporting regions on that first side of the axle plate which faces the axle guide first of all (that is to say, when the axle plate is still non-deformed) forming a flat "V". The maximum possible deformation is achieved when the supporting regions have moved toward the axle guide to such an extent that flat contact of the axle plate with the axle guide occurs in the two supporting regions which are themselves in each case of flat or planar design. In this deformation state, there is no longer any appreciable movability in the direction of the surface perpendicular of the axle guide.

Furthermore, an axle plate, characterized in that the bearing locations are configured as supporting regions which form a flat "V", preferably with an enclosed angle of from 170° to 177.5°, which is to be arranged in the crossing region between the axle beam and the axle guide is proposed to achieve the object.

In relation to the minimization of the degrees of movement freedom of the axle connection which are still possible, it is advantageous, furthermore, if the two supporting regions of the axle plate in each case extend toward the deformation region of the axle plate to such an extent that their spacing from one another is smaller than the width of the mouth for the axle beam, which mouth is formed on the axle plate.

It is proposed by way of a further refinement that the two supporting regions are designed as rounded outer edges on their edges which face away from one another. During the assembly of the axle connection, the first contact between the axle plate and the axle guide is produced in the region of said rounded edges. They form the pivoting bearing as it were during the deformation of the axle seat as far as that state, in which the latter bears flatly with its two supporting regions against the axle guide.

With regard to the aim of an axle connection or an axle plate with fewer degrees of movement freedom, it is proposed by way of a further refinement that the axle plate is provided toward the axle guide with two projections, on which pressure faces are formed such that they face away from one another, each pressure face being provided with a counterpressure face in a manner which lies opposite the axle guides, and a gap being situated between the respective pressure face and counterpressure face before the deformation. A result of this measure is the possibility of positive locking of the axle plate on the axle guide in the axle guide direction, and therefore in the driving direction of the vehicle.

It is proposed by way of a further refinement that the projections which lock the axle plate positively with respect to the axle guide are surrounded by the supporting regions. The projections can be configured, for example, as journals. They are preferably arranged at right angles with respect to the respective supporting region.

Furthermore, it is proposed that each counterpressure face is situated on the wall of a blind hole in the axle guide.

With regard to the loading of the axle beam which is designed as an axle tube, it is advantageous if said axle beam is supported, at least at the beginning of the deformation of the axle plate, exclusively against two pressure faces which are formed on the mouth base and of which the first pressure face is arranged at a spacing in front of, and the second pressure face is arranged at a spacing behind, the mouth center.

Furthermore, an axle guide for guiding an axle beam of a vehicle axle, characterized in that each bearing location is provided with a recess for receiving projections of the axle plate, and in that the recesses are provided with in each case one counterpressure face for pressure faces of the projections of the axle plate which lie opposite one another, the counterpressure faces facing one another, is proposed to achieve the object.

BRIEF DESCRIPTION OF THE DRAWINGS

The invention will be explained in greater detail in the following text, reference being made to the drawings, in which.

DESCRIPTION OF PREFERRED EMBODIMENTS

Figure 3:
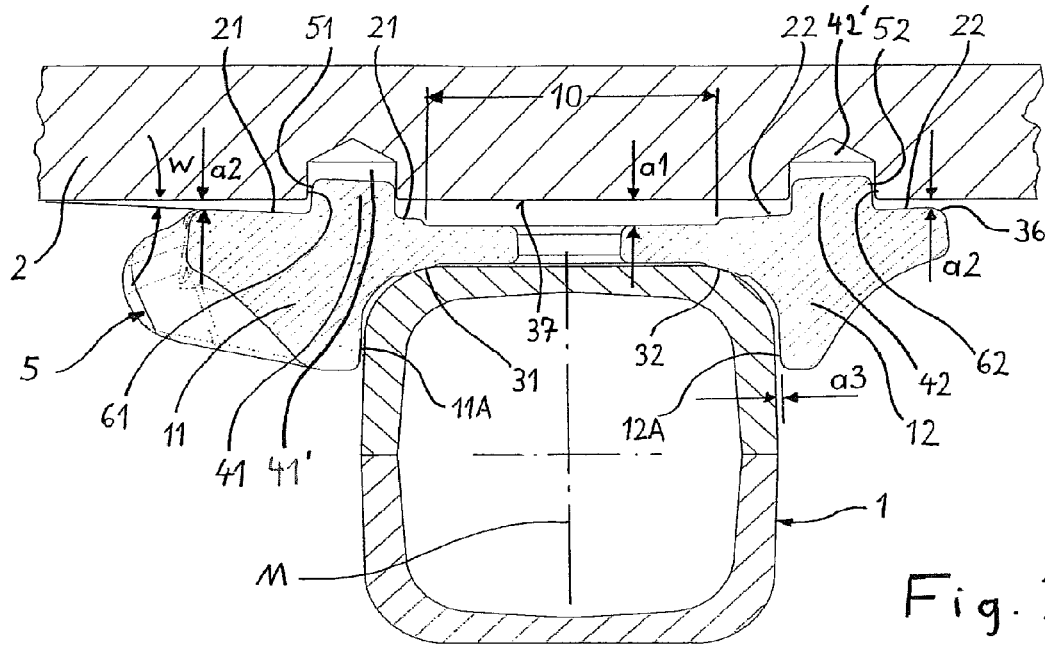
FIG. 3 shows a section, comparable with FIG. 1, through the constituent parts of an axle connection according to the invention, before the assembly thereof, merely the axle connection region of the axle guide being shown.
Figure 4:
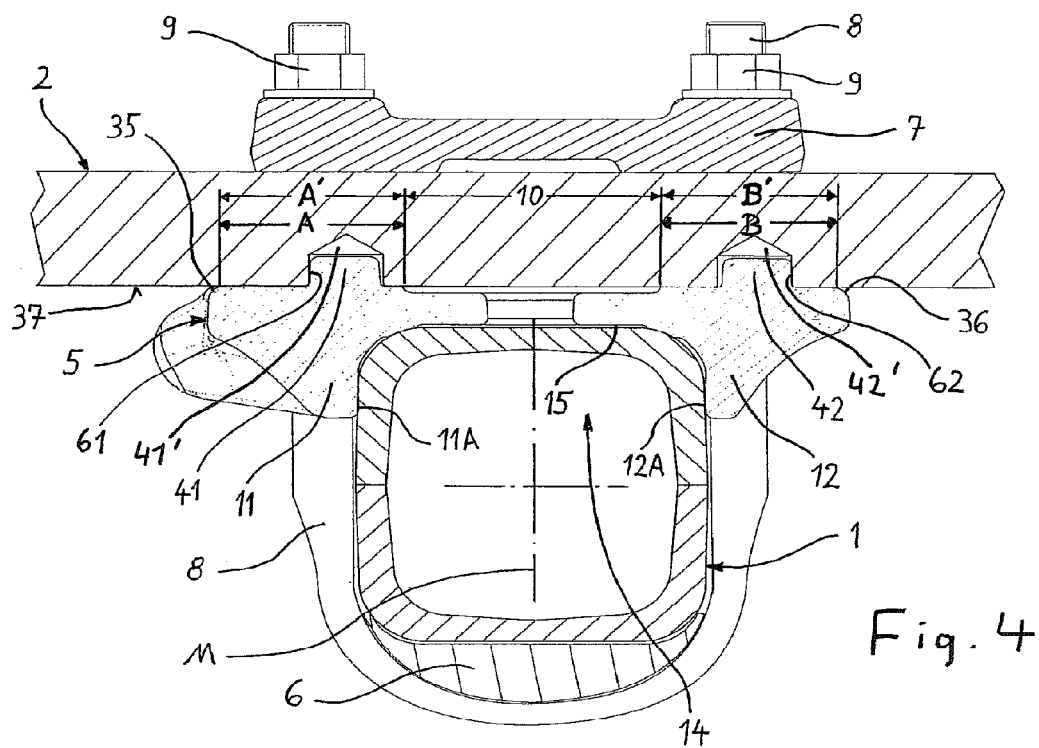
FIG. 4 shows the axle connection according to FIG. 3 after ending of assembly, the axle plate which is contained in the axle connection having been deformed in comparison with the state according to FIG. 3.

The axle connection which is shown before the beginning of assembly in FIG. 3 and after ending of assembly in FIG. 4 is used, above all, in the case of non-driven, pneumatically suspended vehicle axles for heavy trailer vehicles and, in particular, truck trailers and semi-trailers.

Below a vehicle frame of the vehicle, supports are fastened on both vehicle sides, on which supports in each case one axle guide 2 which guides the vehicle axle and serves as a longitudinal link is mounted pivotably. Pneumatic spring bellows are usually arranged between the rear end of the axle guide 2 and the vehicle frame. The two axle guides 2 guide an axle beam 1 which is designed here as an axle tube with a substantially square cross section with corner radii. At the two ends of the axle beam 1 which is of continuous design as far as the other vehicle side, said axle beam 1 is provided with axle stubs, on which the vehicle wheels rotate via anti-friction bearings.

Figure 1:
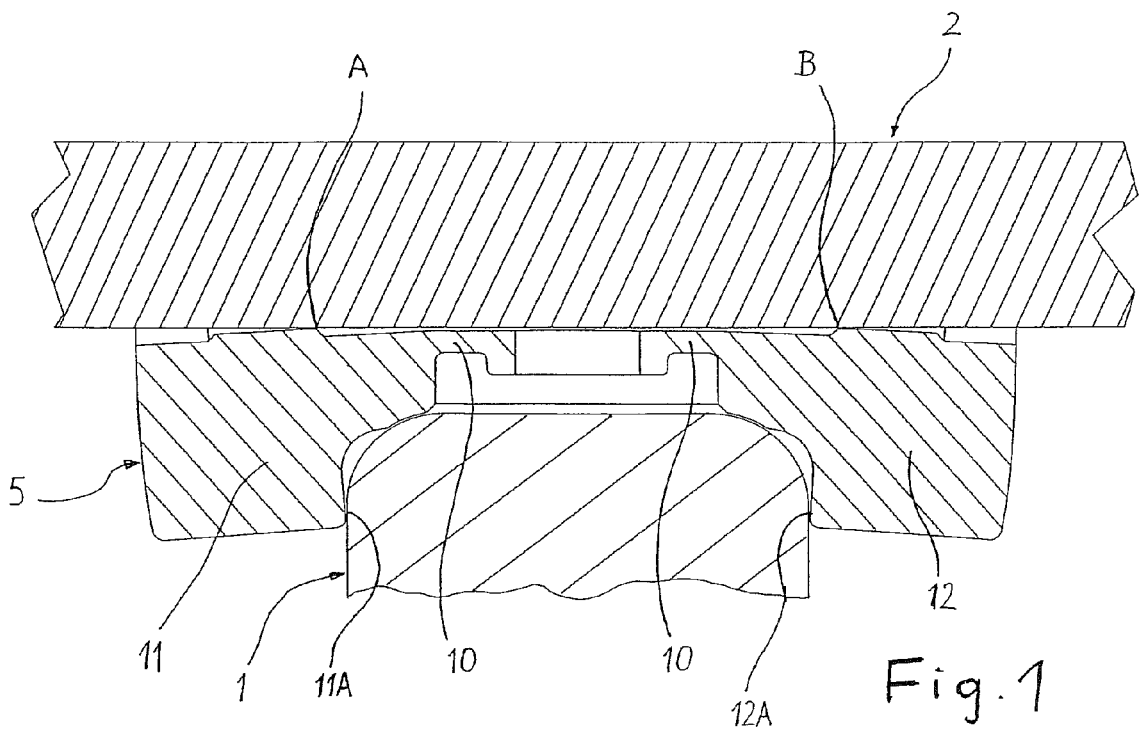
FIG. 1 shows a section through an axle connection for a sprung vehicle axle according to the prior art, namely according to EP 0 810 109 B1.
Figure 2:
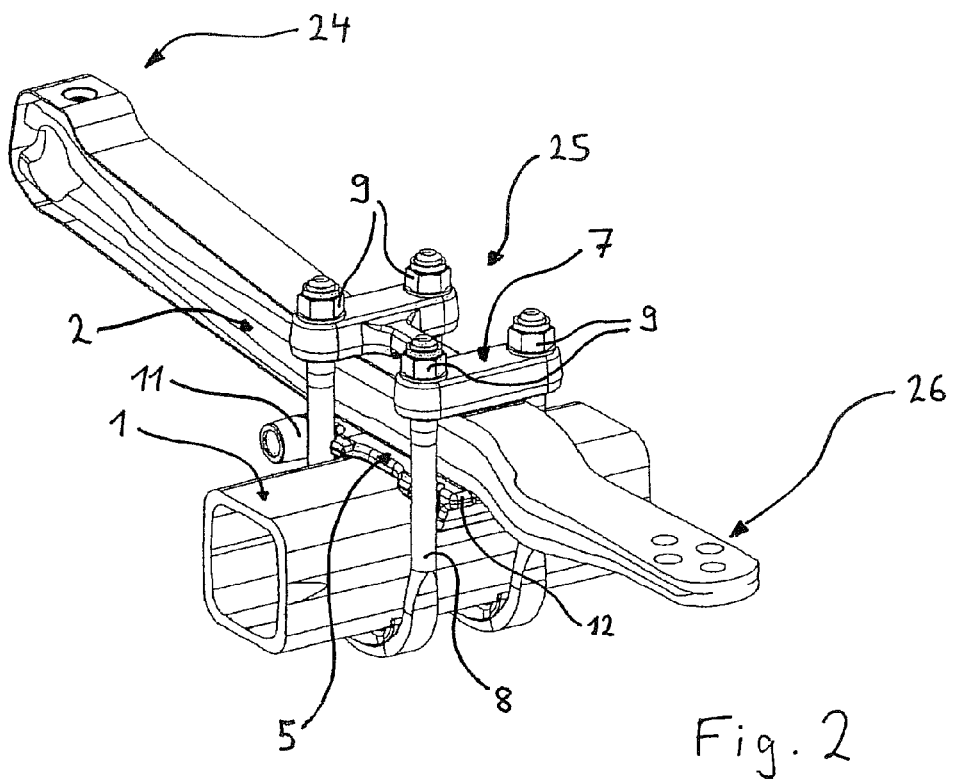
FIG. 2 shows a summary illustration of an axle connection according to the invention after ending of assembly, the axle beam being shown in sectioned form on the other side of the axle connection.

FIG. 2 is a summary illustration of the axle connection which shows the entire axle guide 2. For fastening to the supports, the axle guide 2 has a supporting region 24 at its front end and, for fastening of a pneumatic spring bellows of a pneumatic spring, has a fastening region 26 at its rear end. The axle guide 2 has an axle connecting region 25 between the supporting region 24 and the fastening region 26, that is to say the region of the connection of the axle guide 2 to the axle beam 1.

Moreover, an axle plate 5, an axle seat 6, a spring plate 7, tie rods 8 in the design of U-hoops and securing nuts 9 belong to each axle connection, that is to say the connection of the axle beam to the axle guide.

The axle plate 5 is supported on the axle guide with its first side which points upward in FIGS. 3 and 4 and is supported on the axle beam with its second side which points downward in FIGS. 3 and 4. On said second side, a mouth 14 which engages partially over the axle beam 1 is formed on the axle plate 5, consisting of a mouth base 15 and inner faces 11A, 12A which are formed on jaws 11, 12 of the mouth.

The tie rods 8 which are used in pairs are designed as U-hoops, and their bent ends are guided around the axle seat 6. A tensile stress is generated in the tie rods 8 by way of tightening of the securing nuts 9, as a result of which the axle plate 5 is clamped in between the axle guide 2 and the axle beam 1 and is deformed. The securing nuts 9 are supported from above on the axle guide 2 via the spring plate 7.

It is essential for the axle connection that the axle plate 5 has, approximately in the middle of its length as viewed in the axle guide direction, a deformation region 10, in which the axle plate 5 has an increased deformability in comparison with its remaining material regions. This can be achieved by way of a smaller material thickness in the region of the deformation region 10 or, in addition or as an alternative, by way of cutouts, the removal of material, etc. in said region 10.

It can be seen from FIG. 3 that, before the axle connection is assembled, the axle plate 5 is at a greater spacing a1 from that face of the axle guide 2 which lies opposite in the deformation region 10 than the spacings a2 in the region of the ends of the axle plate which are designed in each case as rounded outer edges 35, 36. If the axle plate 5 is therefore set against the axle guide 2, contact occurs first of all exclusively in the region of the outer edges 35, 36. Beginning at said outer edges 35, 36, supporting regions 21, 22 extend toward the deformation region 10. The two supporting regions 21, 22 are in each case of planar design per se. However, in the starting position according to FIG. 2, they have an angle of attack w with respect to the opposite face 37 of the axle guide 2, as a result of which the two supporting regions 21, 22 together define a flat "V" when the axle plate 5 is non-deformed.

The magnitude of the angle w can be between 1.25° and 5°; 3.2° are particularly favorable. In this case, the angle which is enclosed by the two supporting regions 21, 22 is from 170° to 177.5°, ideally 173.6°.

When the axle beam 1 is attached and tensile load is applied by the tension elements 8, 9, the deformation of the axle plate 5 which is aimed for occurs. During said deformation, there is first of all contact between the axle plate 5 and the axle guide 2 only at the two outer edges 35, 36 of rounded design which form the outer boundary of the two supporting regions 21, 22. Here, the outer edges 35, 36 form as it were in each case pivoting bearings, around which the axle plate 5 is deformed until the supporting regions 21, 22 of completely planar design bear flatly against the opposite face 37 of the axle guide 2. This end state is shown in FIG. 4. Here, the angle of attack w which still exists in the starting state according to FIG. 3 becomes zero, and the flat "V" is spread open as far as approximately 180°. As a result, large-area contact with little surface pressure occurs at both bearing locations A and B or supporting regions 21, 22, without there still being a degree of movement freedom perpendicularly with respect to the face 37 in the bearing region. In addition, high surface pressures do not occur in the bearing region between the axle plate 5 and the axle guide 2, and the retaining forces in the longitudinal direction of the axle guide as a result of friction and therefore a non-positive connection are also transmitted via faces and not only in a locally limited manner.

It is advantageous if full-area contact between the axle beam 1 and the mouth 14 does not occur in the mouth 14; rather, the axle beam 1 is supported exclusively against two pressure faces 31, 32 which are formed on the mouth base 15 at the beginning of the deformation. The first pressure face 31 is arranged at a spacing in front of, and the second pressure face 32 is arranged at a spacing behind, the mouth center M. The pressure faces 31, 32 are of strip-shaped design.

In the starting position in FIG. 3, the inner faces 11A, 12A of the two jaws 11, 12 are still at a small spacing a3 from the respective front and rear side, respectively, of the axle beam 1. During the deformation of the axle plate 5, said spacing a3 becomes zero, with the result that play-free contact occurs, preferably clamping of the two inner faces 11A, 12A against the axle beam 1, as shown in FIG. 4. A precondition is that those regions of the axle plate 5, on which both the supporting regions 21, 22 and the inner faces 11A, 12A are formed, behave substantially rigidly, but at least can be deformed to a lesser extent than the deformation region 10.

With regard to the size of the supporting regions 21, 22 and bearing locations A, B, it is advantageous that they extend in each case toward the deformation region 10 to such an extent that their spacing from one another is low and, in particular, is lower than the width of the mouth 14 as measured between the inner faces 11A, 12A. This is achieved by the two bearing locations A, B immediately adjoining the deformation region 10.

It is advantageous for the position of the strip-shaped pressure faces 31, 32 that they are located where the axle beam 1 has an increased strength despite its tubular design. The wall thickness of the axle beam 1 is namely greater in the region of the quadrant-shaped corner roundings than in the remaining wall regions. Contact with the pressure faces 31, 32 of the axle plate 5 occurs only where the axle beam 1 has its somewhat greater wall thickness and therefore an increased strength. The pressure loading of the axle beam therefore takes place exclusively in its more loadable circumferential regions.

Furthermore, a positively locking connection is achieved between the axle plate 5 and the axle guide 2 in the axle guide direction by way of the axle connection. For this purpose, the axle plate 5 is provided with projections 41, 42 toward the axle guide and the axle guide 2 is provided with corresponding recesses 41', 42'. The projections 41 are situated in front of, and the projections 42 are situated behind, the mouth center M, and pressure faces 51, 52 are formed on them such that they face away from one another. The recesses 41', 42' of the axle guide 2 are provided with in each case one counterpressure face 61, 62 such that they lie opposite each pressure face 51, 52. Before the beginning of the deformation (FIG. 3), a gap is still situated between the pressure face 51, 52 and the respective counterpressure face 61, 62. By way of the deformation of the axle plate 5, said gaps also become zero, with the result that the locking of the axle plate 5 as a consequence of a positively locking connection occurs in the longitudinal direction of the axle guide 2.

The projections 41, 42 are designed as journals which are surrounded by the supporting regions 21, 22 and bearing locations A, B of flat and planar design. The journals 41, 42 preferably extend at right angles with respect to the supporting regions 21, 22 which surround them.

In a manner which is simple in terms of manufacturing technology, the counterpressure faces 61, 62 are designed as walls of blind holes 41', 42', with which the axle guide 2 is provided in its face 37. In order to avoid weakening of the axle guide 2, said blind holes 41', 42' should be merely of such a size as is absolutely necessary for receiving the journals 41, 42 which are formed on the axle plate 5.

The advantage of the journal-shaped projections 41, 42 also consists in the fact that they fix the axle plate 5 laterally, that is to say transversely with respect to the vehicle direction, with respect to the axle guide 2. The axle plate 5 therefore does not have any other lateral supports.

LIST OF DESIGNATIONS

1 Axle beam
2 Axle guide
5 Axle plate
6 Axle seat
7 Spring plate
8 Tie rod
9 Securing nut
10 Deformation region
11 Jaw
11A Inner face of the jaw
12 Jaw
12A Inner face of the jaw
14 Mouth
15 Mouth base
21 Supporting region
22 Supporting region
24 Supporting region
25 Axle connecting region
26 Fastening region
31 Pressure face
32 Pressure face
35 Outer edge
36 Outer edge
37 Surface
41 Projection, journal
42 Projection, journal
41' Recess, blind hole
42' Recess, blind hole
51 Pressure face
52 Pressure face
61 Counterpressure face
62 Counterpressure face
a1 Spacing
a2 Spacing
a3 Spacing, gap
A Bearing location
B Bearing location
A' Bearing location
B' Bearing location
M Mouth center
w Angle

What is claimed is:

1. An axle connection for a sprung vehicle axle, having a tubular axle beam (1), axle guides (2) which cross the axle beam on its upper or underside, an axle plate (5) which is arranged between the axle beam (1) and the respective axle guide (2), and tension elements for pulling the axle beam (1) and the axle guide (2) against one another with deformation of the axle plate (5), the axle plate (5)

being provided on its first side with two bearing locations (A, B) which are spaced apart from one another in the longitudinal direction and at which the axle plate (5) is supported against the axle guide (2), having at least one deformation region (10) between the two bearing locations (A, B), and being provided on its second side with a mouth (14) with a mouth base (15) and two jaws (11, 12) with inner faces (11A, 12A) which face one another, the inner faces (11A, 12A) being directed against the front and the rear side of the axle beam (1), wherein the bearing locations (A, B) are configured as supporting regions (21, 22) which form a flat "V" in the case of a non-deformed axle plate (5), with an enclosed angle of from 170° to 177.5°, wherein the axle plate (5) is provided on its first side with two projections (41, 42) which are provided with pressure faces (51, 52) such that they face away from one another, each pressure face (51 and 52) being provided with an opposed counterpressure face (61 and 62, respectively) on the axle guide (2), and a gap being situated between the respective pressure face (51 and 52) and counterpressure face (61 and 62, respectively) before the deformation.

2. The axle connection as claimed in claim 1, characterized in that the two supporting regions (21, 22) in each case extend toward the deformation region (10) to such an extent that their spacing from one another is smaller than the width of the mouth (14).

3. The axle connection as claimed in claim 1, characterized in that the two supporting regions (21, 22) merge at their edges which face away from one another into rounded outer edges (35, 36).

4. The axle connection as claimed in claim 1, characterized in that the projections (41, 42) are surrounded by the supporting regions (21, 22).

5. The axle connection as claimed in claim 1, characterized in that the projections (41, 42) are journals.

6. The axle connection as claimed in claim 1, characterized in that the projections (41, 42) are arranged at right angles with respect to the respective supporting region (21, 22).

7. The axle connection as claimed in claim 1, characterized in that the counterpressure face (61, 62) is situated on the wall of a blind hole in the axle guide (2).

8. An axle connection for a sprung vehicle axle, having a tubular axle beam (1), axle guides (2) which cross the axle beam on its upper or underside, an axle plate (5) which is arranged between the axle beam (1) and the respective axle guide (2), and tension elements for pulling the axle beam (1) and the axle guide (2) against one another with deformation of the axle plate (5), the axle plate (5)

being provided on its first side with two bearing locations (A, B) which are spaced apart from one another in the longitudinal direction and at which the axle plate (5) is supported against the axle guide (2), having at least one deformation region (10) between the two bearing locations (A, B), and being provided on its second side with a mouth (14) with a mouth base (15) and two jaws (11, 12) with inner faces (11A, 12A) which face one another, the inner faces (11A, 12A) being directed against the front and the rear side of the axle beam (1), characterized in that the bearing locations (A, B) are configured as supporting regions (21, 22) which form a flat "V" in the case of a non-deformed axle plate (5), with an enclosed angle of from 170° to 177.5°, wherein the axle beam (1) is supported, at least at the beginning of the deformation, exclusively against two pressure faces (31, 32) which are formed on the mouth base (15) and of which the first pressure face (31) is arranged at a spacing in front of, and the second pressure face (32) is arranged at a spacing behind, the mouth center (M).

9. An axle plate for arranging in the crossing region between an axle beam and an axle guide of a vehicle, which axle guide guides said axle beam, which axle plate is provided on its first side with two bearing locations (A, B) which are spaced apart from one another in the longitudinal direction for support against the axle guide, is provided on its first side with two projections (41, 42) which are provided with pressure faces (51, 52) that face away from one another, has at least one deformation region (10) between the two bearing locations (A, B), and is provided on its second side with a mouth (14) with a mouth base (15) and two jaws (11, 12) with the inner faces (11A, 12A) which face one another, wherein the bearing locations (A, B) are configured as supporting regions (21, 22) which form a flat "V", with an enclosed angle of from 170° to 177.5°.

10. The axle plate as claimed in claim 9, characterized in that the two supporting regions (21, 22) extend in each case toward the deformation region (10) to such an extent that their spacing from one another is smaller than the width of the mouth (14).

11. The axle plate as claimed in claim 9, characterized in that the two supporting regions (21, 22) merge at their edges which face away from one another into rounded outer edges (35, 36).

12. The axle plate as claimed in claim 9, characterized in that the projections (41, 42) are surrounded by the supporting regions (21, 22).

13. The axle plate as claimed in claim 9, characterized in that the projections (41, 42) are journals.

14. The axle plate as claimed in claim 9, characterized in that the projections (41, 42) are arranged at right angles with respect to the respective supporting region (21, 22).

15. An axle plate for arranging in the crossing region between an axle beam and an axle guide of a vehicle, which axle guide guides said axle beam, which axle plate is provided on its first side with two bearing locations (A, B) which are spaced apart from one another in the longitudinal direction for support against the axle guide, has at least one deformation region (10) between the two bearing locations (A, B), and is provided on its second side with a mouth (14) with a mouth base (15) and two jaws (11, 12) with the inner faces (11A, 12A) which face one another, wherein the bearing locations (A, B) are configured as supporting regions (21, 22) which form a flat "V", with an enclosed angle of from 170° to 177.5°, wherein, in order to support the axle beam, the axle plate is provided on its second side exclusively with two pressure faces (31, 32) which are formed on the mouth base (15) and of which the first pressure face (31) is arranged at a spacing in front of, and the second pressure face (32) is arranged at a spacing behind, the mouth center (M).

16. An axle guide for guiding an axle beam of a vehicle axis, having a supporting region (24) for the pivotable support of the axle guide with respect to the vehicle frame, an axle connecting region (25) for connecting the axle guide to the axle beam, and a fastening region (26) for a pneumatic spring, the axle connecting region (25) having two bearing locations (A', B') which are spaced apart from one another in the longitudinal direction of the axle guide for supporting corresponding bearing locations of an axle plate which is arranged between the axle guide and the axle beam, characterized in that each bearing location (A', B') is provided with a recess (41', 42') for receiving projections of the axle plate, and in that the recesses (41', 42') are provided with in each case one counterpressure face (61, 62) for pressure faces of the projections of the axle plate which lie opposite one another, the counterpressure faces (62, 62) facing one another.

17. The axle guide as claimed in claim 16, characterized in that each counterpressure face (61, 62) is situated on the wall of a blind hole (41', 42').

* * * * *